Sept. 15, 1970                    W. DE BACK                       3,528,470
                          STRIP PEELER FOR PINEAPPLES
Filed Aug. 9, 1968                                          10 Sheets-Sheet 2

FIG. 3A

A— First Slit

FIG. 3B

B { First Peel
    Second Slit

FIG. 3C

C— Second Peel

FIG. 3D

D— Third Slit

FIG. 3E

E { Third Peel
    Fourth Slit

FIG. 3F

F— Fourth Peel

FIG. 20A

First Slit

FIG. 20B

First Peel
Second Slit

FIG. 20C

Second Peel

FIG. 4D   FIG. 21A

First Slit

FIG. 4E   FIG. 21B

First Peel

Second Slit

FIG. 4F   FIG. 21C

Second Peel

INVENTOR.
WILLIAM de BACK

BY F. W. Anderson
   C. E. Tripp
                    ATTORNEYS

Sept. 15, 1970  W. DE BACK  3,528,470
STRIP PEELER FOR PINEAPPLES
Filed Aug. 9, 1968  10 Sheets-Sheet 6

FIG_12

INVENTOR.
WILLIAM de BACK
BY F.W. Anderson
C.E. Tripp
ATTORNEYS Sept. 15, 1970 W. DE BACK 3,528,470
STRIP PEELER FOR PINEAPPLES
Filed Aug. 9, 1968 10 Sheets-Sheet 8

INVENTOR.
WILLIAM de BACK
BY F. W. Anderson
C. E. Tripp
ATTORNEYS

United States Patent Office 3,528,470
Patented Sept. 15, 1970

3,528,470
STRIP PEELER FOR PINEAPPLES
William de Back, Santa Clara, Calif., assignor to Castle & Cooke, Inc., Honolulu, Hawaii, a corporation of Hawaii
Filed Aug. 9, 1968, Ser. No. 751,445
Int. Cl. A23m 7/00
U.S. Cl. 146—222
19 Claims

ABSTRACT OF THE DISCLOSURE

Pineapples are contour peeled in strips by pushing them with chains over equiangular slitters and undercut peelers disposed at axially spaced stations. A screw can be used to augment the feeding action of the pusher chains.

FIELD OF THE INVENTION

This invention relates to fruit preparation and more particularly to the contour strip peeling of pineapples.

DESCRIPTION OF PRIOR ART

The patent to Taylor 2,034,160, Mar. 17, 1936 discloses an automatic pineapple machine wherein pineapples are pushed through a circular array of slitting knives, which knives are interrupted to receive undercutting peeling knives for strip peeling of the fruit. All twelve slits are made at one time and at the same depth. The strips do not follow the pineapple contour. The undercut peelers are staggered progressively along the machine and the peels are removed one at a time by star wheels located at each of the undercut peelers. The pineapples are advanced by a sequential series of three pusher conveyors along the slitters and peelers.

SUMMARY OF THE INVENTION

The apparatus of the invention has several important features which are as follows:

(1) The pineapples are contour peeled in strips with the slits following the contour of the pineapples.

(2) The pineapples are advanced over the cutting knives by external endless chains. These not only advance the fruit over the knives, but also confine the peels and prevent tearing of the flesh underneath the peels by the cutting knives.

(3) A minimum of force is required to perform the peeling operation. This is performed by pre-slitting at one station and then undercutting the slits at a succeeding station, these operations being equally angularly disposed at their respective stations. Despite the relatively small amount of force required to perform the peeling action, twelve strips can be removed at six relatively closely spaced stations.

(4) The slits and other cutting actions are performed at each station at zones which are spaced by a multiple of the strip width, which prevents the removal of the flesh underlying the strips when the strips are removed.

(5) The endless chains which advance the pineapples across the knives not only hold the pineapples together as they are being slit, but pull the strips away from the peel cylinder at the end of the process.

(6) The action is vertical. This arrangement, coupled with the chain construction described, permits the pineapples and strips to be disposed of by gravity chutes.

DESCRIPTION OF THE PREFERRED EMBODIMENT

General plan of the machine

Figures 1, 2:
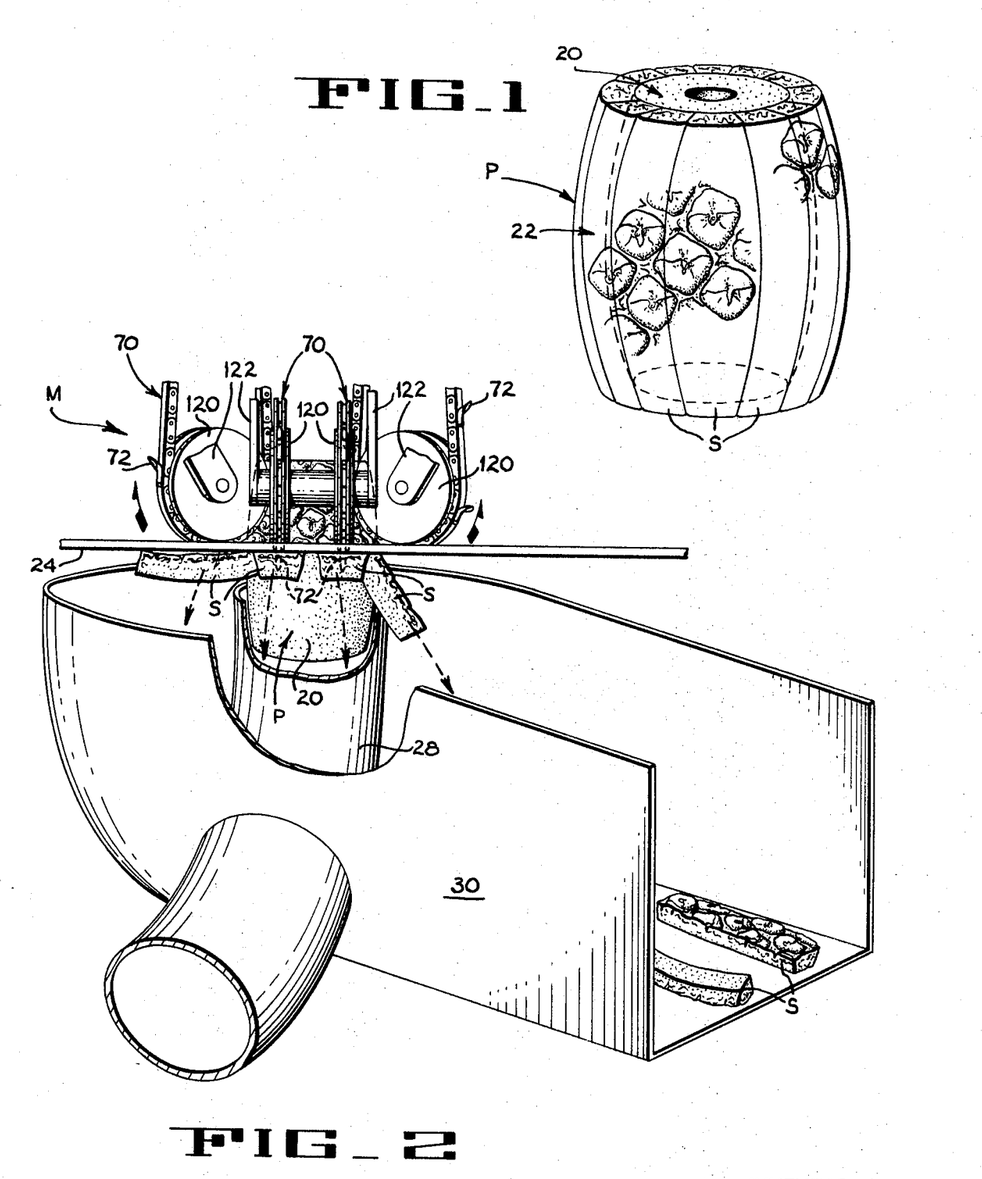
FIG. 1 is a diagram showing a pineapple and the strips removed therefrom in their original position.
FIG. 2 is a perspective showing the lower or discharge end of a machine embodying the invention.

Referring to FIGS. 1 and 2, a pineapple P which has been trimmed at both ends can be considered as comprising a main body of flesh 20 which is referred to in the art as the "cylinder," even though in this case, due to the contour peeling action of the present invention, the body 20 is more accurately described as being an ovoid cylinder. The shell 22 containing the eyes is removed under this invention in the form of twelve axial strips S.

FIG. 2 shows the lower delivery end of a machine M embodying the invention, and it can be seen how the cylinder 20 emerges free of the peel strips. Also clearly seen in the view are the lower ends of two pushing or feeding chains 70 which also confine the fruit during the peeling action and maintain the shell strips S together with the cylinder 20. However, at the discharge end of the machine the feeder chains 70, which have small hooks that engage the peel strips S, pull the strips free of the cylinder 20. A plate 24 strips those strips S which adhere to the chains, from the chains.

The cylinder 20 drops by gravity into a discharge chute 28 which is central of the machine. The peel strips S drop by gravity into a surrounding chute 30 for separate disposition.

In the preferred embodiment of the invention, the slitting and peeling action takes place at six stations spaced axially along the machine, which stations are in the order of two to three inches apart. This makes for a compact machine. The machine, as mentioned before, is arranged vertically and hence occupies but little floor space.

FIGS. 3A to 3F show the cutting actions that take place at six stations A to F, respectively. For convenience, the cutting zones at each stations are oriented and located in these figures by assigning to them clock face numbers or "zones."

Figure 3A:
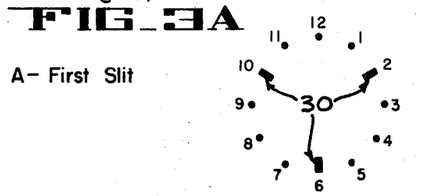
FIGS. 3A to 3F are diagrams showing the slitting and peeling action in a six station machine embodying the invention.

FIG. 3A illustrates the action taken at station A, wherein the first slits are performed at zones 2, 6, and 10. These slits penetrate the shell and that portion of the underlying flesh that contains the eyes. In other words their depth corresponds to that of both the shell cut and the juice cut.

Figure 3B:
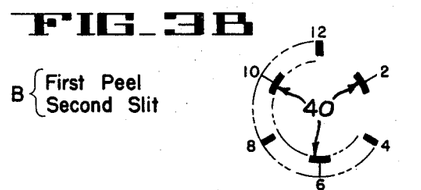

FIG. 3B shows the action at station B, wherein the first peeling or undercutting action takes place at zones 2, 6 and 10 which were slit at station A. Simultaneously at station B a second slitting occurs at zones 4, 8 and 12. It will be seen that the second slits occur in the center of the 120° spaces between zones 2, 6 and 10 that were previously slit and are now undercut (peeled).

Figure 3C:
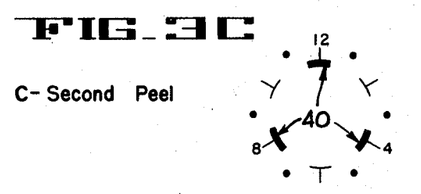

FIG. 3C shows the action at station C, wherein the second undercutting (peeling) action is performed at zones 4, 8 and 12 which were preslit at station B, as just described. Note that zones 2, 6 and 10 have been previously both slit and undercut.

Figure 3D:
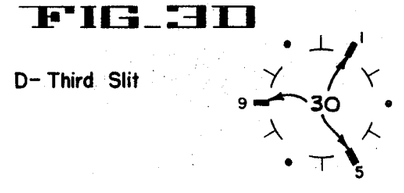

FIG. 3D shows the action at station D, wherein the third slits are made at zones 1, 5 and 9. It will be noted that all the previously slit zones have been undercut by the time the pineapple reaches station D so that no peeling but only slitting, takes place at station D. Station D corresponds to station A in this regard.

Figure 3E:
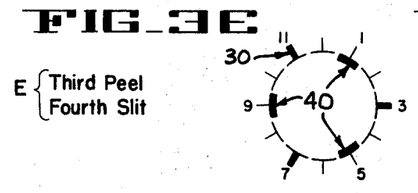

FIG. 3E shows the action at station E, wherein undercutting cuts are made at zones 1, 5 and 9 which were preslit at station D. Also, the fourth set of slits are made at zones 3, 7 and 11, this being the final set of slits.

Figure 3F:
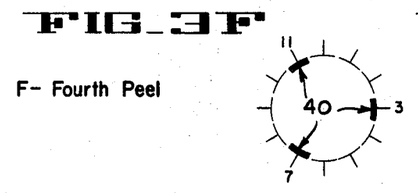

FIG. 3F shows the action at station F, wherein the fourth undercuts are made at zones 3, 7 and 11, which were preslit at station E. It will be seen now that if the peeling or undercutting knives encompass a sufficient angular extend (about 30° or ¾" to 1" in width), the entire pineapple will be peeled as illustrated in FIG. 1. Of course, these figures illustrate maximum sized fruit. If the fruit is smaller than the maximum size, the slits and the undercuts will be somewhat closer together, and will overlap somewhat but this does not modify the characteristics of the present invention.

Figure 4D:
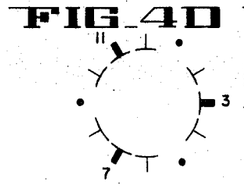
FIGS. 4D to 4F show angular variations in cutter positions from FIGS. 3D to 3F, respectively.
Figure 4E:
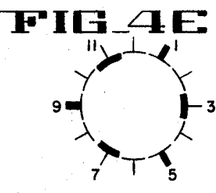
Figure 4F:
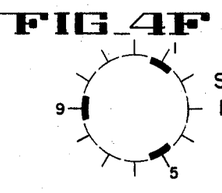

FIGS. 4D to 4F illustrate modified positions of the elements of FIGS. 3D to 3F respectively. In these figures, alternately available zones are utilized instead of those of FIGS. 3D to 3F, as will be apparent from a comparison of FIGS. 3D with 4D, etc.

Knife assembly

Figure 5:
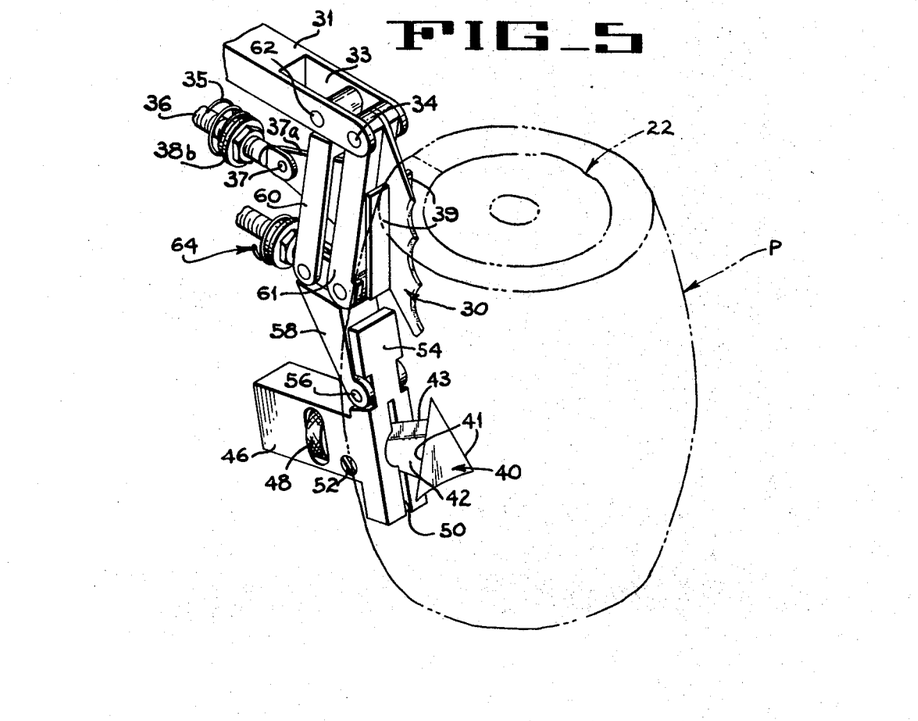
FIG. 5 is a perspective illustrating the relation of a slitting and undercutting knife element at successive stations.
Figures 7, 9:
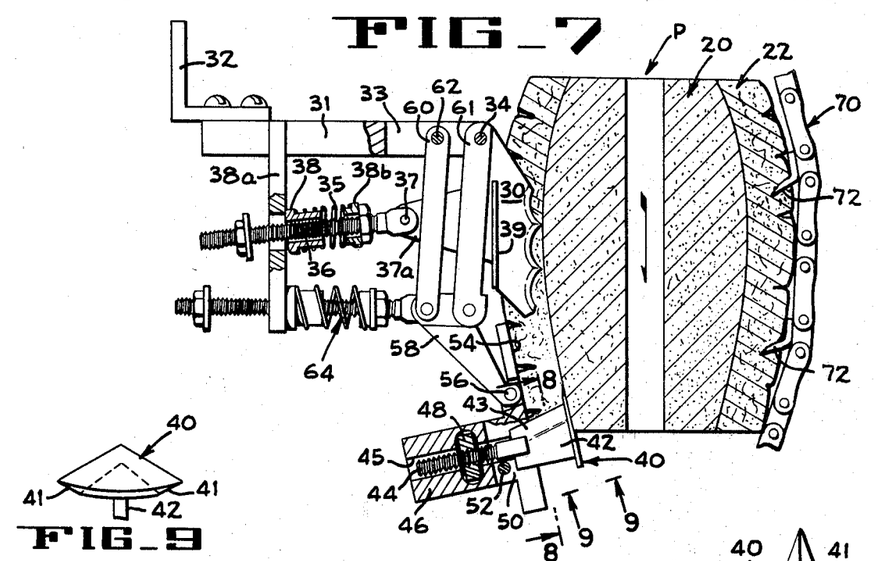
FIG. 7 is a view showing the axially slitting and undercutting (peeling knife) during an intermediate portion of the action.
FIG. 9 is an end perspective view of the knife looking from 9—9 of FIG. 7.

FIGS. 5 and 7 show the principles of construction of successive slitting and undercutting knife assemblies (FIGS. 5 and 7).

Referring to FIGS. 5 and 7, the assembly mounts a slitting blade 30 and an undercutting or peeling blade 40, there being a peeling blade 40 beneath the slitting blade 30 in each assembly.

The slitting blades are mounted so that they slit to a constant depth, following the contour of the pineapple. They are pivotally supported on radial bars 31 secured to frame elements 32 (FIG. 7) of the machine. Each bar 31 is notched at 33 (FIG. 5) and the blade 30 is pivoted on the bar at 34. Each blade is spring projected towards the pineapple by a spring 35 (FIG. 7) which surrounds a spring post 36 that is pivotally mounted at 37 to a rearwardly projecting ear 37a of the blade. The threaded spring post slides through a spring seat 38 which is backed up by a depending arm 38a. The other end of the spring 35 seats on an adjustable spring seat assembly 38b so that the force by which the spring 35 urges the slitting knife 30 into the pineapple can be varied. The depth of slit is predetermined by laterally projecting ears or gauge flanges 39.

As seen in FIGS. 5 and 7, the triangular peeling or undercutting blade 40 is disposed directly beneath the slitting blade 30. The apex of the blade 40 points upwardly and sharpened edges 41 (FIGS. 8 and 9) diverge therefrom. The triangular blade is mounted on a web or blade 42 (FIG. 7) having a sharpened upper edge 43 for riding in the slit made by the slitting blade 30. The web 42 projects from a threaded mounting post 44 slidable in a bore 45 formed in a mounting block 46. The blade 40 is extended or retracted by means of a knurled adjusting nut 48. The block 46 is slotted at 50 so that a clamp screw 52 can maintain the adjustment. The block 46 has a gauge face 54 which is spring urged against the outer shell of the pineapple, to limit the depth cut of the triangular blade. This depth is adjusted so that it corresponds with the depth of the cut made by the slitting blade 30.

The block 46 is pivotally mounted at 56 on a fork 58 which is in turn mounted for radial motion towards and away from the pineapple. It will be noted that the gauge face 54 projects upwardly beyond the pivot 56 for the block, so that the downwardly force of the pineapple exerted on the triangular blade and the web 43 (which exerts a pivoting force about the pivot 56) is resisted by the engagement of the upper portion face 54 with the pineapple, as can be best visualized in FIG. 7. The block 46 acts as a counterweight about the pivot 56 to urge the knife toward the fruit.

The inner faces of the blades 40 can be on segments of a circle whose diameter represents the medium peeled fruit diameter. For example, if the medium maximum fruit diameter is three inches, the blade faces will be on a three inch circle and such blades will handle fruit having a diameter of two and a half to three and a half inches. These are relatively small, and for larger fruit ranges, the medium blade diameter would be increased.

The blade fork 58 is mounted for a substantially rectilinear movement on parallelogram links 60, 61 which are pivotally mounted in the slot 33 on the arm 31 that also supports the slitter blade 30. The upper pivot of the link 61 is also the pivot 34 for the slitter blade, whereas the link 60 has its own pivot 62 on the arm 31. The fork 58 for the triangular blade 40 is spring projected by an adjustable tension spring mechanism indicated generally at 64, which is a substantial duplicate of the spring mechanism for the slitting blade 30 and need not be described in detail.

Figures 8, 10, 10A:
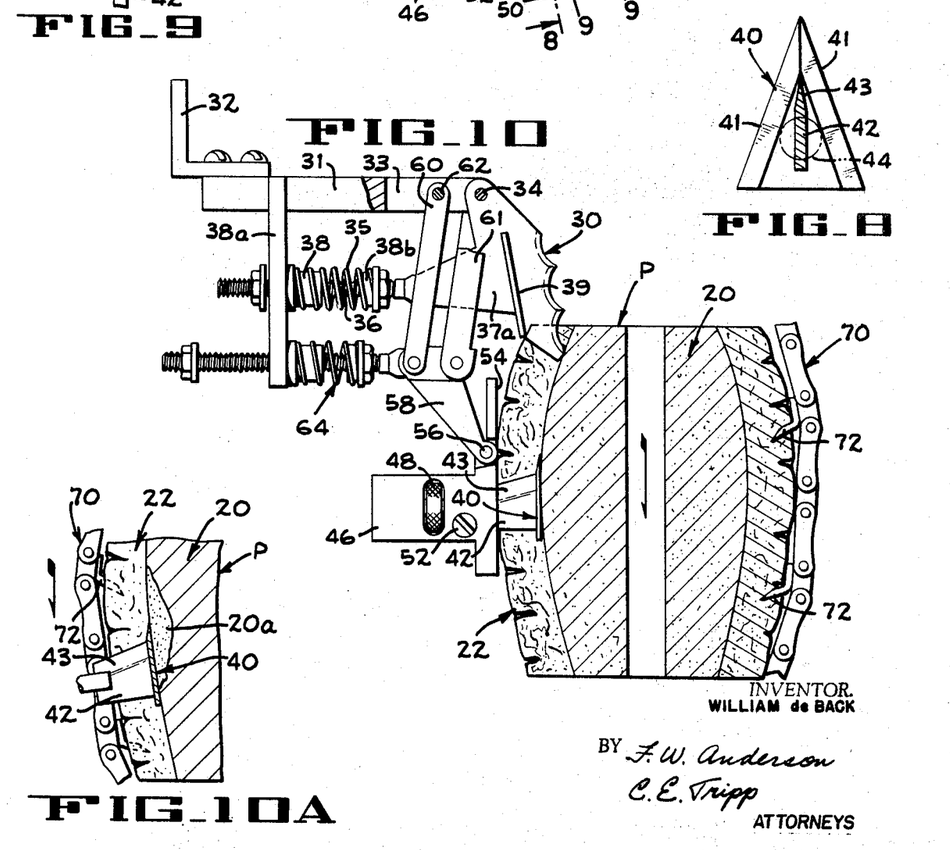
FIG. 8 is a view of the undercutting (peeling) knife taken on line 8—8 of FIG. 7.
FIG. 10 is a view like that of FIG. 7 later in the cutting action.
FIG. 10A is a view showing where the chains prevent tear-away of flesh beneath the peel strips.

As can be seen in FIG. 7, as the pineapple is moved downwardly over one of the blade assemblies just described, the lower end of the pineapple will first engage the slitting blade 30 which will immediately begin to slit the pineapple radially at a depth determined by the gauge plate 39. The slit thus formed is soon brought down against the peeling or undercutting blade 40 and the triangular web blade 43 rides in the slit. The triangular blade itself undercuts the slit on both sides thereof, as seen in FIGS. 10 and 14.

Feeder chains

Figure 6:
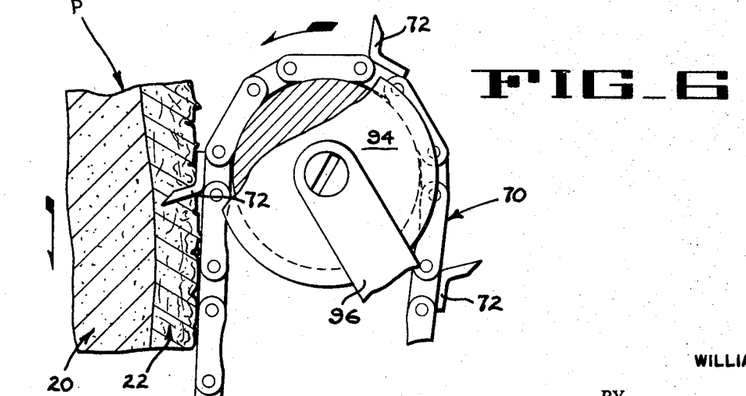
FIG. 6 is a fragmentary view showing the principle of one of the pusher chains.

One of the features of the invention is that the pineapples are externally gripped and move down over the various slitting and peeling blades and that this gripping also holds the peeled strips in place against the cylinder 20 of the fruit until the pineapple emerges from the machine, as shown in FIG. 2. This combined feeding, gripping and confining motion is performed by the sets of radially oriented chains indicated generally at 70 which chains have teeth 72 (FIG. 6) that are embedded in the shell 22 of the fruit. These chains are under tension so that they closely embrace the fruit and urge the peeled strips against the fruit. This prevents a body of the flesh indicated at 20a (FIG. 10A) from being torn loose from the body of fruit as the peel is detached therefrom by the blade assembly. The details of the mounting and drive for the chains 70 are given subsequently.

Arrangement of the knives in the machine

Figure 11:
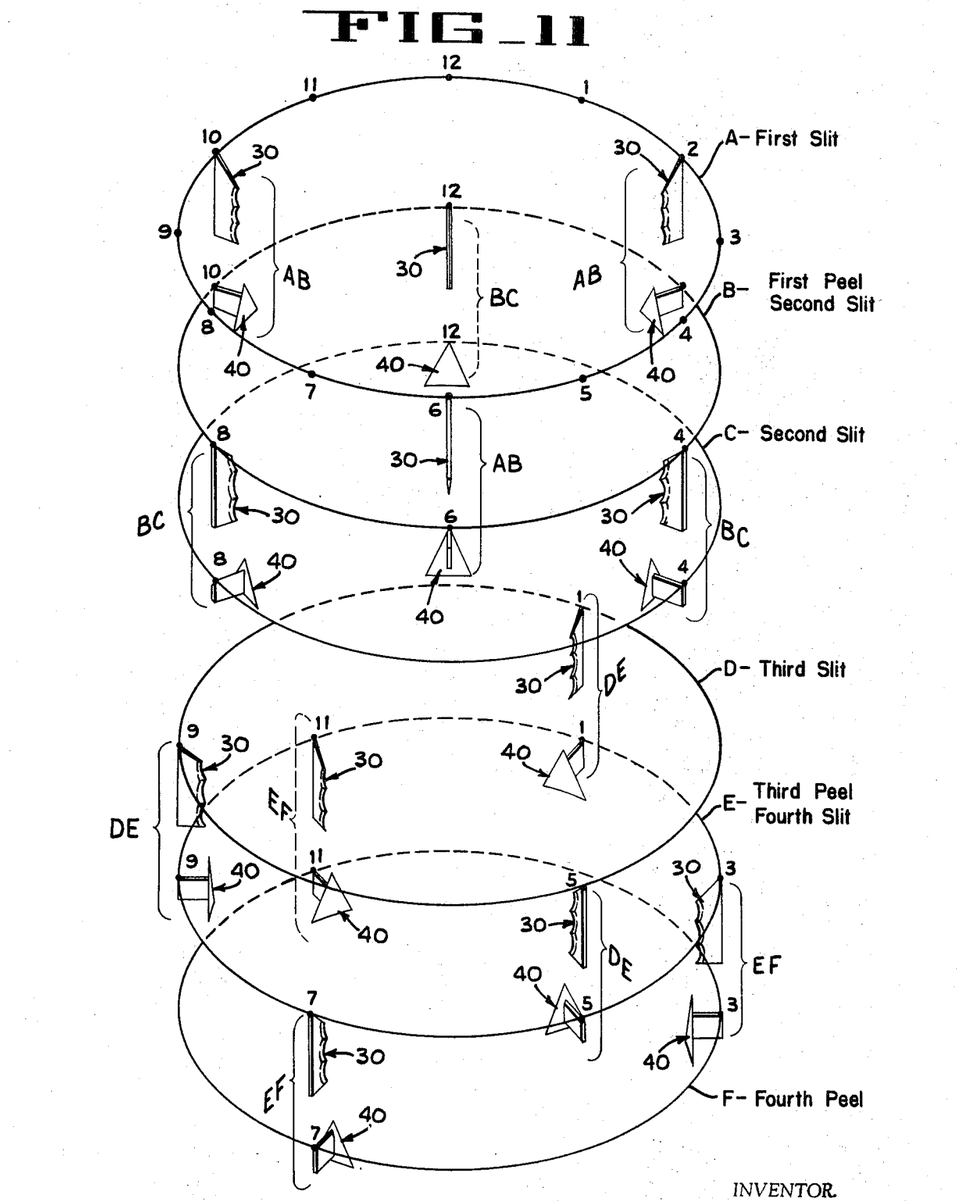
FIG. 11 is a perspective diagram showing an arrangement of knives that accomplish the cutting plan of FIGS. 3A to 3F.

FIG. 11 is a perspective schematic diagram showing the arrangement of the knives in the machine. The arrangement of the knives shown in FIG. 11 produces the slits and undercuts described in connection with FIGS. 3A to 3F respectively. The zone numbering systems, namely, zones 1 to 12 at each of the stations A to F respectively illustrated in FIGS. 3 to 3F is duplicated in FIG. 11 and the description therein need not be repeated. It will be noted that slitting and undercutting knives are grouped at adjacent stations into sets AB (stations A and B); BC; DE; and EF. A slitter knife 30 at any station is followed by a triangular bladed undercutting or peeling knife 40. It will be seen in FIG. 11 that the knives of each set, AB, etc., are arranged at 120° angular spacings, and the groups are circumferentially staggered, all as best seen from examination of the figure itself. For example, the sets labeled AB includes the slitting knives 30 and the triangular peeling knives 40 which cooperate to perform the operations at zones 2, 6 and 10 of stations A and B (see also FIGS. 3A and 3B). It is one of these sets, such as the set AB for example, that is illustrated in FIG. 5 and in other figures of the drawings.

The sets labeled BC are the slitting knives of station B and the peeling knives at station C (see also FIGS. 3B and 3C).

The sets labeled DE are the slitting knives at station D and the peeling knives at station E (FIGS. 3D and 3E); and the sets labeled EF are the slitting knives at station E and the final peeling knives at station F (FIGS. 3E and 3F).

This combined vertical and circumferential staggering of the blades is an important feature, it reduces the force required to push pineapples through the machine, and hence prevents tearing of the fruit by the feeder chains or by the screw to be described in connection with a modified embodiment.

General arrangement of complete machine

Figure 12:
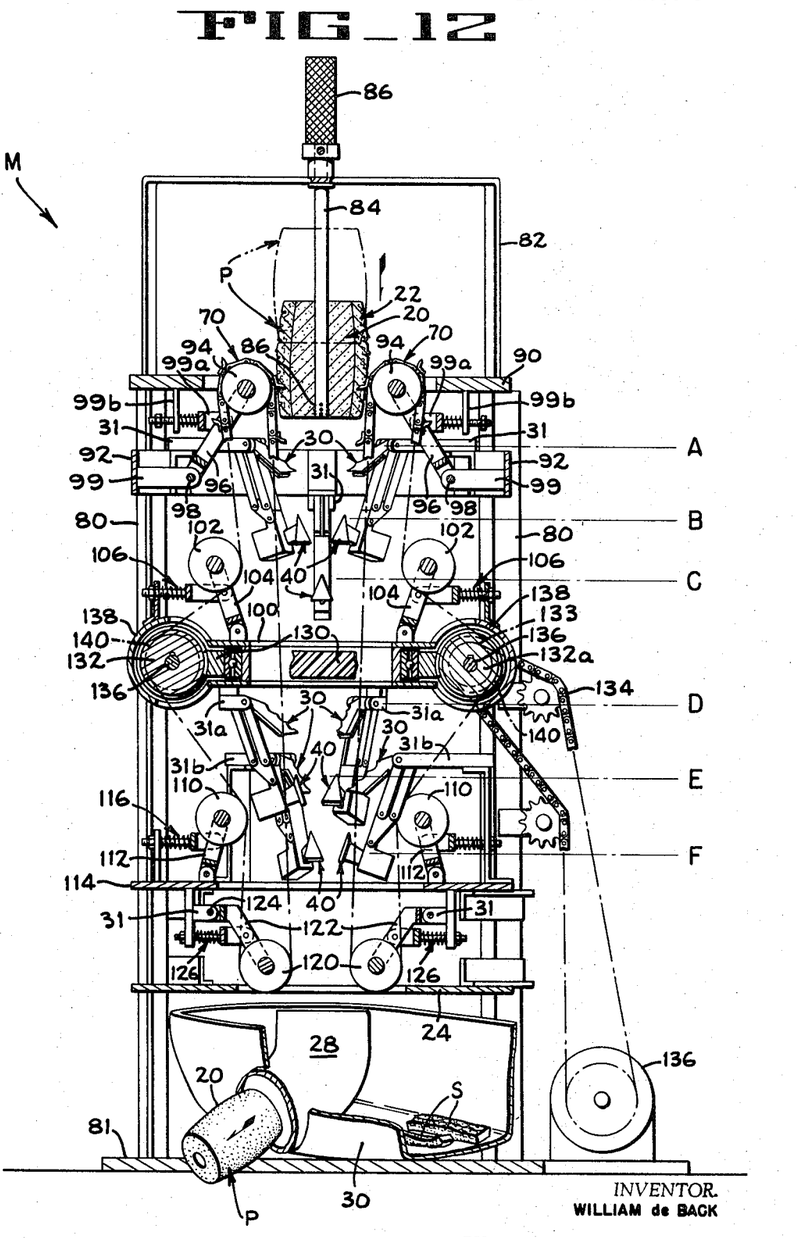
FIG. 12 is a vertical section through the machine that accomplishes the cutting plan of FIG. 11.
Figures 12A, 12B, 13, 14:
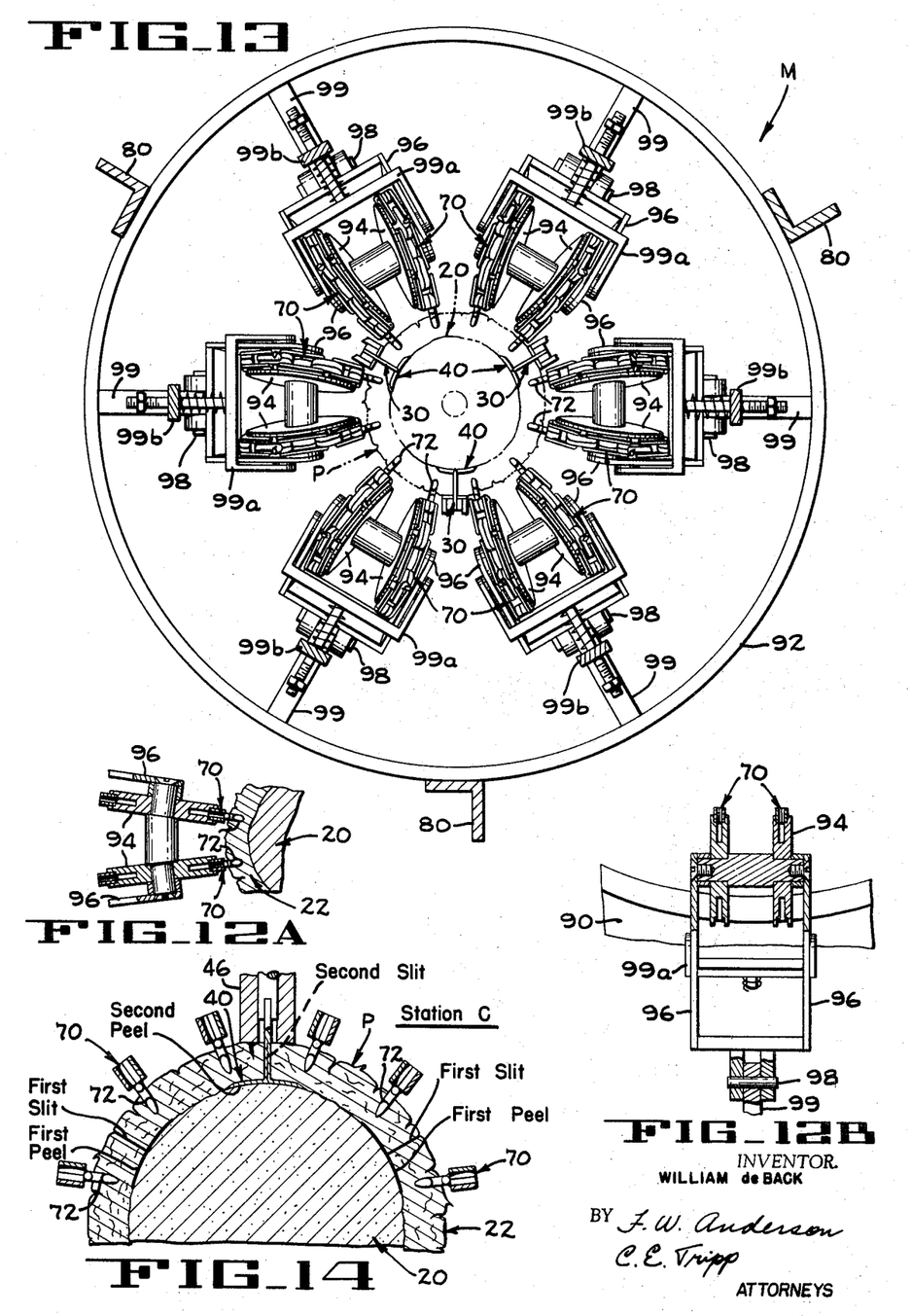
FIG. 12A and 12B are chain idler details.
FIG. 13 is a plan of the machine.
FIG. 14 is a diagram illustrating the cutting action at station C.

The general arrangement of a complete machine embodying the present invention appears in FIGS. 12 and 13. The over-all chain and idler mechanism is also seen clearly in FIG. 19. The machine M embodies framework, only the most important details of which are shown and which includes vertical legs 80 supported on the floor by a base plate 81 (FIG. 12). The top of the machine has a cradle 82 which mounts a core hole receiving post 84 that can be lifted by a handle 86. This represents a simplified loading system for the machine, it being understood that the details of the feeding mechanism are not critical to the present invention and hence the machine is shown as hand loaded.

In order to initiate a cycle, the handle 86 is lifted and the pineapple P (which will have been previously trimmed and cored) is slipped over the loading pin 84 which pin has prongs 86 formed thereon to grip the core recess. The pineapple is then forced down between the inner runs of the endless chain 70, which grip the pineapple and feed it or push it through the various stations A–F, as previously described. In FIG. 12 the machine has been vertically sectioned so that all of the knives at the various stations A–F do not appear.

The machine has a top plate 90 and an upper ring 92. Upper idler pulleys 94 (see also FIG. 6) for the chains 70 are pivoted on links 96, the lower ends of these links being pivoted at 98 on ears 99 projecting inwardly from the rings 92. The upper idler pulleys 94 are spring urged inwardly towards the pineapples by a spring loaded fork 99a, the construction of which appears in FIG. 12B. The fork springs are backed up by ears 99b (FIG. 12) depending from the ring 90.

Figures 19, 19A, 19B:
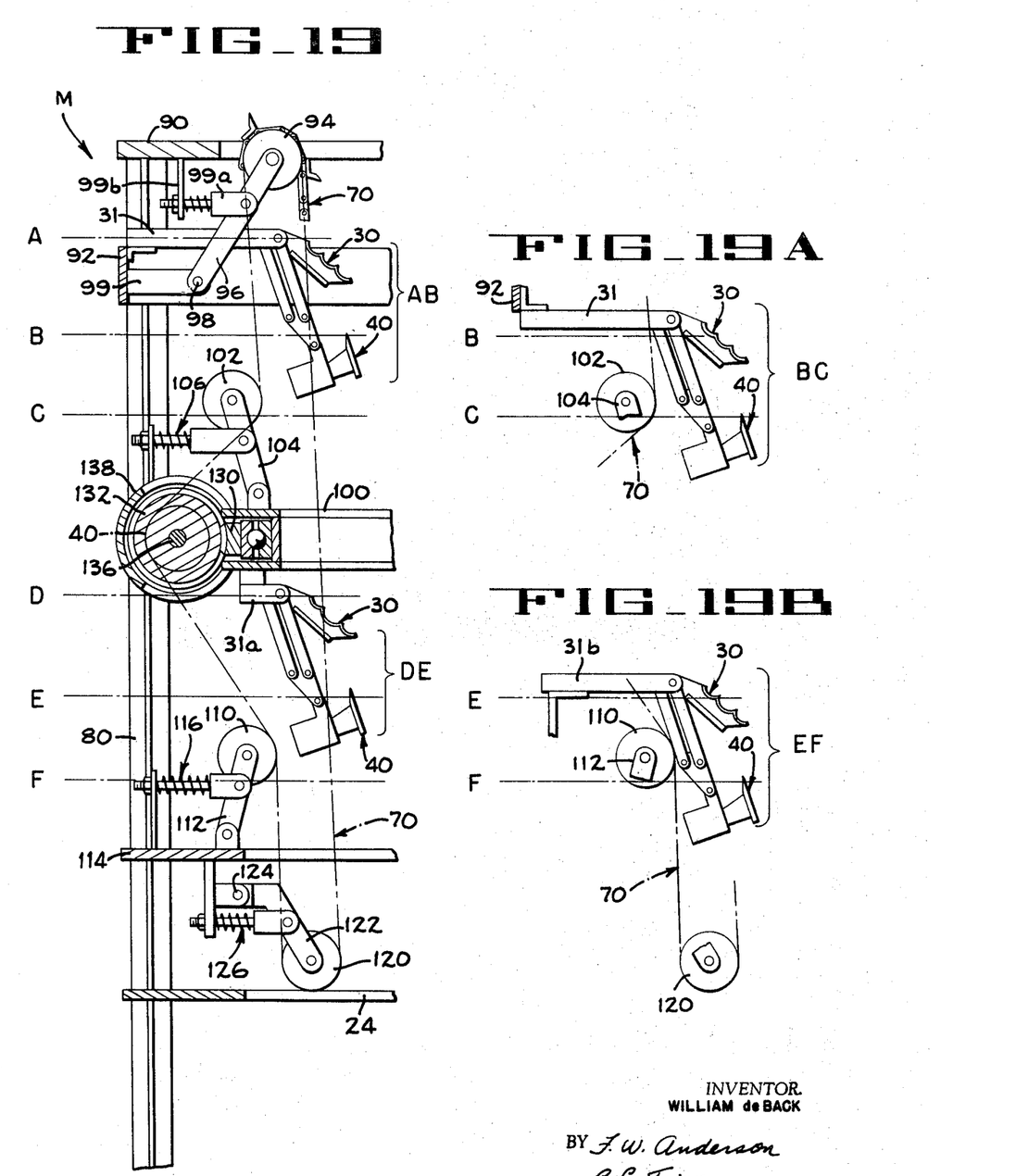
FIG. 19 is a diagrammatic vertical section of the machine.
FIGS. 19A and 19B are side elevational diagrams in the same plane showing one set of knives at each station.

The arms 31 for the upper set of knives at stations A and B project radially from the upper ring 92 (see also FIG. 19).

The sets of knives BC, only one of which appears in FIG. 12, are mounted on arms which project radially from the lower face of the ring 92 (see also FIG. 19A).

At the midplane of the machine, an angular internal ring 100 is provided which is supported on brackets from the frame, not shown for clarity. The ring 100 mounts on its upper face intermediate idlers 102 for the chains, which idlers are mounted on pivoted links 104 and projected by spring fork assemblies 106, similar to those described previously. The mounting arms 31a for the knife assemblies DE are secured to the lower face of the intermediate ring 100.

The knife mounting arms 31b for the last two pairs of slitting and triangular knives EF project radially inwardly from brackets at the frame posts, as can be seen at the lower right of FIG. 12. The springs that project the knives toward the pineapples have been omitted in FIGS. 12 and 19 for clarity.

Returning to the chain mechanism, lower intermediate idlers 110, which correspond generally to the upper intermediate idlers 102, are mounted on arms 112, the lower ends of which are pivoted on an annular frame plate 114. These idlers are spring projected by spring fork assemblies 116 to take up the slack in the chains.

The lowermost chain idlers are indicated at 120 and these idlers are mounted on arms 122 which are pivoted at 124 to brackets depending from the plate 114. These idlers are spring projected by spring fork assemblies 126.

FIGS. 13 and 14 show how the chains are actually disposed circumferentially around the machine so as to urge the peel strips S against the cylinder 20, as the chains push the pineapples along the various knives.

Chain drive mechanism

Figure 15:
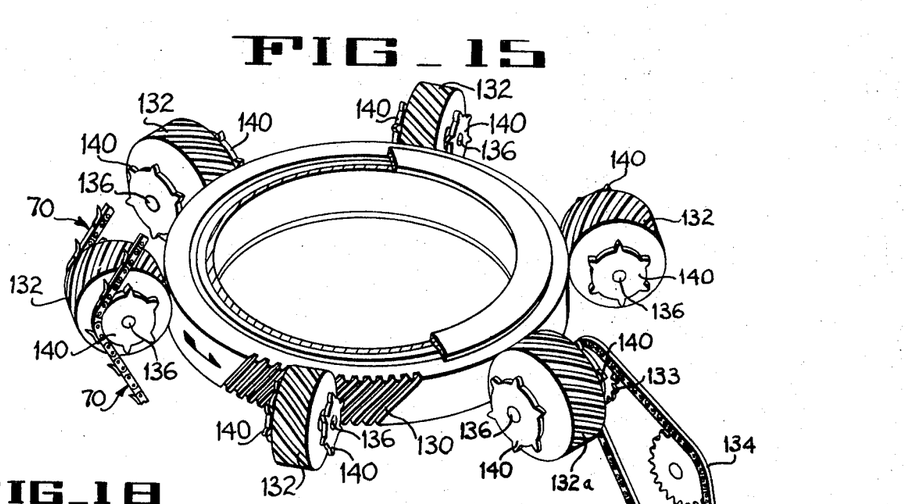
FIG. 15 is a perspective diagram showing the drive for the pusher chains.
Figures 16, 17, 18:
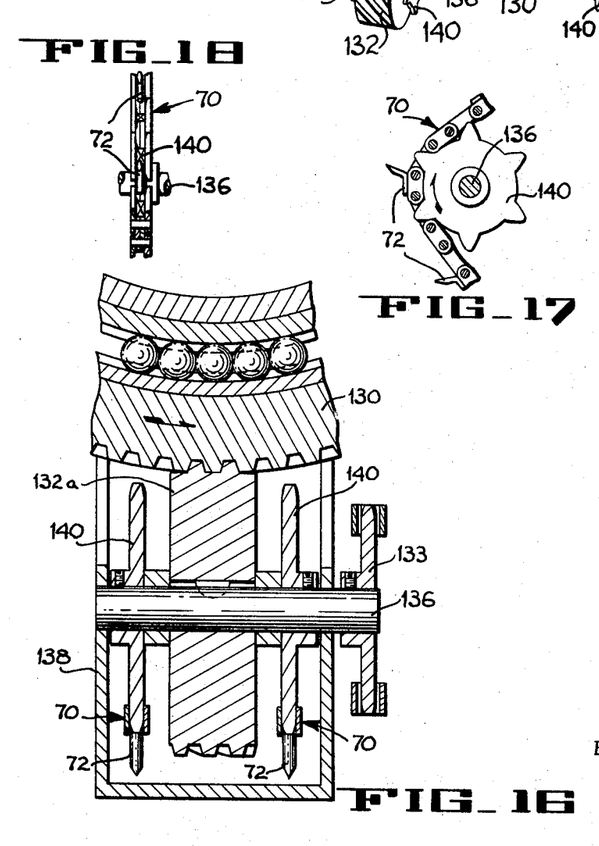
FIG. 16 is a horizontal section through one of the chain driving assemblies.
FIG. 17 is an enlarged view showing one of the drive sprockets for the chain.
FIG. 18 is an end view of the chain drive.

As can be seen in FIG. 13, the chains are arrayed around the circumference of the pineapple in relatively closely spaced gripping zones, i.e. they have an angular spacing of about 30 degrees. Also, the chains must clear the knives and provide a passage for the pineapples. The problem of driving this array of chains is solved by the use of an annular helical gear 130 (FIGS. 12 and 15) at the intermediate frame ring 100 (FIGS. 12 and 19), which gear meshes with six helical pinions 132, as best seen in FIG. 15. One of the pinions, 132a, has a sprocket 133 (FIGS. 15 and 16) that is driven by a chain and sprocket assembly 134 and a drive motor 136. Thus pinion 132a drives the ring gear 130 which, in turn, drives the other pinions 132. As seen in FIG. 16, the pinion 132a (and the pinions 132) are mounted on shafts 136 which are journalled in housings 138 mounted on the frame ring 100. The chains 70 are trained over drive sprockets 140 which straddle the helical gear pinions 132, 132a.

The driving connection between the chains 70 and their sprockets 140 are illustrated in detail in FIGS. 17 and 18 and the construction of the chain links for this driving arrangement is apparent from these figures.

Thus, it can be seen that when the drive motor 136 drives the helical pinion 132a through its sprocket 133 and the chain sprocket mechanism 134, this rotates the annular helical gear 130, which in turn drives the other helical pinions 132. Thus all of the chain driving sprockets 140 are rotated and advance the chains 70, so that the inner chain reaches move downwardly to grip and advance the pineapples through the machine.

Diagrams FIGS. 19–19B

The general arrangement of the machine shown in FIG. 12 is drawn in somewhat diagrammatic form in FIGS. 19, 19A and 19B, for purposes of further illustration of the mode of operation of the device. FIG. 19 also shows the chain driving mechanism at one set of knives AB, BC, DE, and EF, FIG. 19A shows set BC and FIG. 19B shows set EF, thus representing the stations A to F, all as previously described and illustrated in FIGS. 11 and 12, and diagrammed in FIGS. 3A to 3F. Reference to FIG. 11 shows that none of these sets lie in the same plane, but for ease of understanding the sets of undercutting or slitting knives have, in FIGS. 19–19B been brought into the plane of the paper. The sets AB and DE are actually displaced 30 degrees from one another. For example, if the pair AB illustrated in FIG. 19 were at the 10 o'clock zone (FIG. 11) the set DE would be at the 9 o'clock zone. The knife set BC (FIG. 19A) that successively follows the set AB is shown off to one side of the diagram of FIG. 19 for clarity in illustration. This set can be assumed to be the knife set BC at the eight o'clock zone as seen in FIG. 11, but it has also been brought into the plane of the paper. Similarly, the knife set EF, which performs the final slitting end undercutting operations, can be considered to be those at either the seven o'clock or the eleven o'clock zone shown in the diagram of FIG. 11, but in FIG. 19 the set EF has been brought into the plane of the paper. Thus, FIGS. 19–19B clarify how pineapples are successively slit and undercut as they are formed downwardly through the machine, but it must be understood that these occur at different angular stations in accordance with the diagram of FIG. 11. FIG. 19 further illustrates how, at station B there is both a peeling or undercutting at one angular position and a slitting in another. This dual cutting also occurs at station E, as is apparent from the diagram of FIG. 11 as well as from the layouts of FIGS. 3B and 3E. FIG. 19 also illustrates one of the chain assemblies and drive in schematic form, as previously described.

OPERATION

The operation of the preferred embodiment will now be summarized briefly. The core recess pin 84 (FIG. 12) is raised by the handle 86 and the pineapple is forced over the pin. The pin is then lowered to bring the pineapple within the envelope of chains 70, with manual assist if necessary. These chains are moving downwardly and grip and move the pineapple down over the various knives in the sequence described. This sequence is best explained relative to FIGS. 11 and 19–19B. At station A, the slitting knives 30 of the first knife set AB slit the pineapple and follow its contour in the manner previously explained in connection with FIGS. 7 and 10. Immediately below the slitter 30 at station A are triangular blades 40 at station B. Each triangular blade makes a circumferential undercut of about 30°. The total of twelve blades 40 provide 360° circumferential undercutting or peeling.

To continue the operation, the pineapple also passes over the blade set BC with the slitters 30 at station B performing the second slit angularly displaced from the undercutting or peeling operation performed by the triangular blades at station B. The triangular peeling blades at station C follow in the slits produced by the slitters 30 at station B, all as described. The action is now half completed (FIG. 3C) with six angularly spaced slit and undercut zones, at 2, 4, 6, 8, 10 and 12 o'clock.

The pineapples next pass over the knife sets DE, the upper blades of each set being the slitters 30 and the lower being triangular peeler blades 40. This adds a new set of slit and undercut zones, namely at 1, 5 and 9 o'clock (FIG. 3E) and at new angular positions. There are also slitters 30 at station E which form the upper blades of the final blade set EF, so that while the pineapple is being peeled at station E it is also being slit at the same station but at different angular positions. These slits at station E are followed up by the final peeling blades 40 at station F, giving completed slit-undercuts at 3, 7 and 11 o'clock (FIG. 3F) and completing the cutting action.

During this slitting and peeling process, the pineapples are externally gripped at zones between the blades so that the peeled strips are maintained firmly against the flesh. The peels will not strip flesh from the underlying cylinder 20 to produce the undesirable condition diagrammed in FIG. 10A. FIG. 14 emphasizes how the circumferentially confining and gripping action of the chains 70 maintain the integrity of the fruit during the peeling operation.

FIG. 2 shows how the chains 70 strip the peels away from the peeled cylinder 20 with the peeled cylinder falling in the central chute 28 and with the peel strips S falling in a surrounding hopper and chute assembly 30.

The action of the apparatus can be quite rapid without loss or tearing of the flesh. As a matter of fact, it has been found that the total peeling cycle from the time that the fruit is gripped by the chains until the time it emerges therefrom may be in the order of one second.

The strip peeling apparatus of the present invention makes it possible to contour peel small size fruit. Previously, the smaller sized fruit did not fit in the normal large scale production machinery and it had to be dealt with in the manner which downgraded the net value of the fruit relative to the net value of the fruit that is rapidly contour peeled in accordance with the present invention.

The ovoid cylinder 20 of the present invention, in the case where smaller fruit is being processed, will probably not be sliced but will be made into chunks, or cocktail pineapple tidbits. This ovoid strip peeling of the smaller fruit thereby represents savings between the true cylinder and between the ovoid cylinder produced by the present invention. It is also noted that the present invention obviates the need for successive shell and juice cuts for contour peeling; rather contour peeling is obtainable by a single pass over sets of blades which removes both the shell and the layer of flesh underneath the shell that contains the eyes, commonly referred to as the juice cut. The ability to produce a deep cut of this type is characteristic of the present invention and is a particular advantage of the type of feeding mechanism provided, namely the external gripping and feeding chain assembly 70.

Modified geometrical arrangements

Figure 20A:
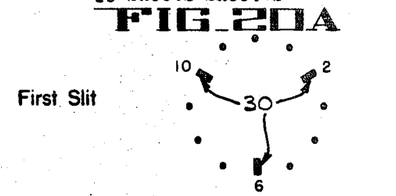
FIGS. 20A–20C show a modified peeling plan using 60° knives.
Figure 20B:
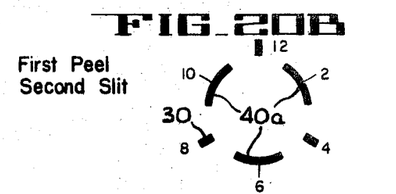
Figure 20C:
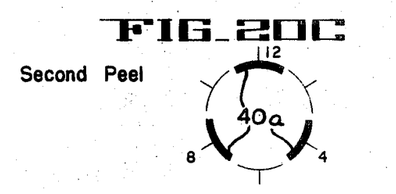

The preferred embodiment of the invention makes twelve 30° cuts or undercuts for peeling, thereby minimizing the force required to propel the fruits through the knives. In some cases it may be possible to make 60° cuts on the fruit without tearing. Such geometrical arrangement appears in FIGS. 20A to 20C. It will be seen that this arrangement is in effect, a duplicate of the geometrical patterns of FIGS. 3A to 3C. It will also be seen by inspection of FIGS. 20A to 20C, that with the slitting blades 30 and the peeling blades 40a arranged as shown, the triangular peeling blades 40a encompass an angle of 60°. Thus, after the third operation of FIG. 20C, namely the second peel operation, the pineapple will be completely peeled in strips, but these will be 60° strips.

Figure 21A:
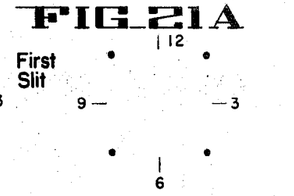
FIGS. 21A–21C show a modified peeling plan using 45° knives.
Figure 21B:
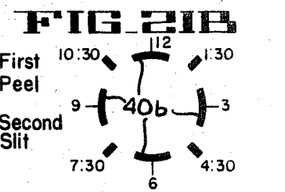
Figure 21C:
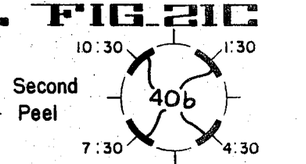

FIGS. 21A to 21C illustrate still another geometrical pattern which can be employed under the present invention. In this invention, three stations are employed as in the embodiment just described, but there are four undercutting triangular peeling blades 40b at the second and third stations. These blades encompass 45°, and with this disposition of blades, inspection of FIGS. 21A to 21C clearly show how the pineapple can be completely peeled in three steps.

Screw feed modification

In some instances where the fruit is particularly difficult to peel without tearing, it may be desired to augment the feeding action of the chain 70 by a special rotating screw that passes up through the axis of the machine.

Figures 22, 23, 24, 25:
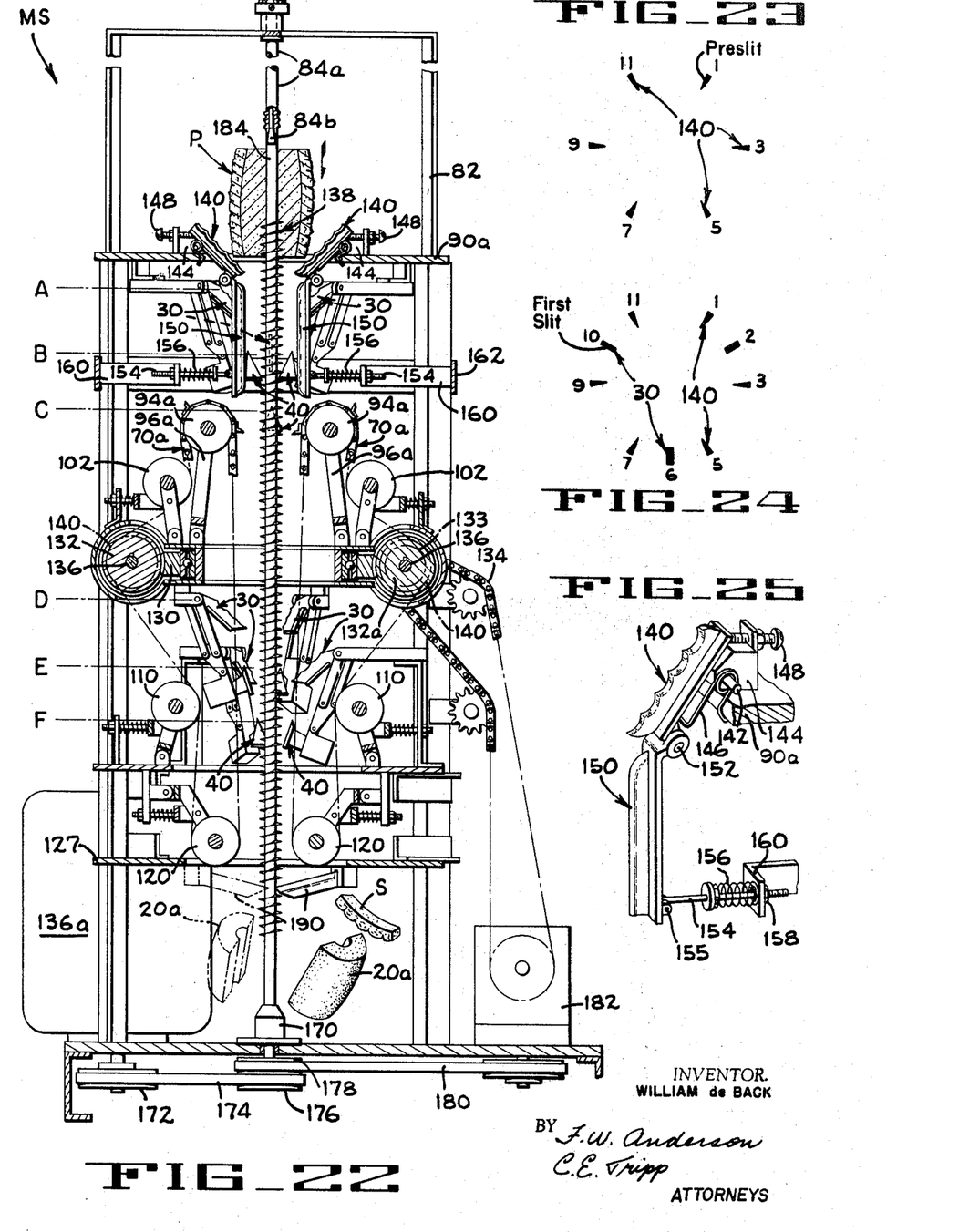
FIG. 22 is a section through a modified machine using a screw feed.
FIG. 23 is a plan of the present knife pattern.
FIG. 24 is a plan showing the first slit.
FIG. 25 is a perspective of a preslit knife.

FIG. 22 illustrates a machine MS, which is the machine M previously illustrated, to include an auxiliary feed screw 138. This screw bites into the well surrounding the core recess and assist in pulling the pineapples down through the machine.

In the machine of FIG. 22, the screw pulls the pineapple down into the chain assembly 70a whereupon the chains and screw cooperate to feed the pineapple. In order that the screw can bite into the flesh of the pineapple surrounding the core hole, the pineapple must be held from rotation. This is accomplished by pre-slitting the pineapple with slitting knives 140.

FIG. 23 shows the pre-slit pattern with the pre-slitting knives 140 positioned at the 1, 3, 5, 7, 9 and 11 o'clock positions.

FIG. 24 shows the condition of the pineapple when it receives the first slits at station A. The slitting and undercutting or peeling actions at stations A to F being the same as that of the machine previously described.

FIG. 25 shows the assembly mounting of the six pre-slitting knives 140. Each knife is pivoted at 142 on a block 144 which is supported on the upper plate 90a of the machine MS. A spring 146 urges the slitting knives into the path of the pineapple as it is moved downwardly through the machine. An adjustable stop 148 determines the depth by which the spring 146 can pivot the knife 140 radially inwardly.

In order to assist in holding the pineapple against rotation as it progresses downwardly from the pre-slitting knives 140, each pre-slitting knife is followed by an auxiliary knife 150 which rides in the slit made by the knife 140. The auxiliary knives 150 are pivoted at the lower end of their respective slitting knives 140 at 152. They are spring urged radially inwardly toward the pineapples at their lower ends. This spring mechanism includes a spring rod 154 pivoted to the auxiliary knives 150 at 155 (FIG. 25) and urged radially inwardly by a coil spring 156. A stop 158 limits the inward motion of the auxiliary knife, which stop seats against a bracket 160 and mounts the spring assembly (FIG. 22) on a frame ring 162.

Referring to FIG. 22, the screw 138 is mounted in bearing 170 at the lower end of the machine and is driven by a motor 136a and a motor pulley 172, a V-belt 174 and a screw pulley 176. A companion pulley 178 drives a V-belt 180 and a gear box 182 which in turn drives the chain 134 for the chain assemblies 70a, in the manner previously described. The upper end of the screw 138 is stabilized by a manually slidable post 84a, which functions as does the post 84 for introducing the pineapple onto the screw. In addition, the lower end of the post 84a is formed with a conical socket that seats on a conical bearing 84b forming the end of the screw 138.

In operation of the machine MS, the post 84a is lifted as before and the core recess of a pineapple inserted over the post. The pineapple post is then brought down until the core recess engages the helix of the screw 138 which now feeds the pineapple over the pre-slitting knives 140 to make the six pre-slits as shown in FIG. 23. In the form of the invention shown, manual operation is required to slide the pineapple down over an unthreaded upper end 184 of the screw until the walls of the core recess is engaged by the helix of the screw. Thereafter, the pineapple must be held from rotation manually long enough for the pre-slitting knives 140 to take hold and once this occurs the rest of the operation is automatic. The pineapple is fed down along the auxiliary knives 150 during which time it passes through stations A to F as before.

Below station B, the pineapple engages the upper chain assemblies at the upper pulleys 94a and thereafter the chains assist in feeding the pineapple and maintaining the integrity thereof as previously described. When the pineapple has been peeled, the strips S leave the machine in the manner previously described. However, the cylinder, 20 is split into halves 20a (as seen in the bottom of FIG. 22) by halving blades 190 fixed at the bottom plate 127 of the machine. The means for disposal of the strips and the pineapple halves leaving the bottom of the machine have been omitted from FIG. 22 for clarity of illustration, these details not being critical to the present invention.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. The method of strip peeling pineapples or the like, comprising the steps of externally gripping the fruit along its length at circumferentially spaced zones and moving the gripping zones and hence the fruit past axially spaced cutting stations, first slitting the fruit between the gripping zones at some stations and then undercutting the slits at succeeding stations for producing the strip peels.

2. The method of claim 1, wherein the pineapples are moved downwardly during cutting, and wherein the peeled cylinder and the strip peel fall in separate paths by gravity.

3. The method of claim 1, wherein the slitting and peeling strips are paired at adjacent stations.

4. The method of strip peeling pineapples or the like, comprising the steps of axially slitting the fruit equiangularly at a first station at zones spaced by multiples of a strip width; circumferentially undercutting the first station slits along their length by a strip width at a second station while simultaneously axially slitting the fruit equiangularly at new zones spaced by multiples of a strip width at said second station; and undercutting the second station slits by a strip width at a third station.

5. The peeling method of claim 4, wherein the pineapples are moved vertically downwardly, and the strip peels and the peeled cylinder are gravity collected separately.

6. The peeling method of claim 4, wherein three slits are made at said first and second stations with the undercuts at the second and third stations encompassing substantially 30 degrees; and wherein the processes of said first three stations are respectively repeated at three more stations offset 30 degrees from the corresponding first three stations.

7. The peeling method of claim 4, wherein the fruit is moved past said stations and the strip peels are confined by externally gripping the fruit along its length at circumferentially spaced zones that are between the slits.

8. The peeling method of claim 7, wherein the fruit gripping zones on the fruit are moved with the fruit and advance the fruit past said stations.

9. The peeling method of claim 4, wherein both the slit depth and the undercutting follow the pineapple contour.

10. Apparatus for the axial strip peeling of pineapples or the like comprising means forming a plurality of axially spaced cutting stations, knife means for first equiangularly slitting and then undercutting the slits at successive stations, and equiangular, endless peeled strip confining and fruit advancing means engaging the periphery of the fruit and urging the fruit past said stations.

11. The apparatus of claim 10, wherein there are two sets of three of said stations offset by 30 degrees around the fruit; in each set of stations, there being knives for making three first slits at the first station, three first undercuts and three second slits at the second station; and three second undercuts at the third station; said undercuts encompassing about 30 degrees of the fruit.

12. The apparatus of claim 11, wherein both said slitting and said undercutting knife means are pivotally mounted to follow the pineapple contour.

13. The apparatus of claim 11, wherein said undercutting knife means comprises triangular knife blades with curved inner faces.

14. Apparatus for strip peeling fruit such as pineapples or the like, comprising means forming a plurality of axially spaced cutting stations; successive equiangular slitting and cutting knives at said stations; equiangular, axially running chains disposed around said stations for engaging the fruit periphery and confining the peeled strips; and means for driving said chains with the fruit.

15. The apparatus of claim 14, whereby said chains have points which bite into the shell of the fruit.

16. The apparatus of claim 14, wherein said chains are driven by a circumferential set of helical gears and a common helical ring gear.

17. The apparatus of claim 16, whereby means are provided for driving one of said set of helical gears, thereby driving the ring gear and the remainder of the set of helical gears.

18. The apparatus of claim 17, wherein the chains wrap around spring pressed idler sprockets at the ends of the apparatus, and wherein said set of helical gears drives the return reaches of said chains.

19. The apparatus of claim 14, wherein a central auxiliary screw is rotated to grip the core hole walls and thus assist in feeding the fruit past the cutting stations.

References Cited

UNITED STATES PATENTS

| | | | |
|---|---|---|---|
| 1,984,709 | 12/1934 | Taylor | 146—6 |
| 2,130,980 | 9/1938 | Chattin et al. | 146—43 |
| 3,382,900 | 5/1968 | De Back | 146—43 X |
| 3,424,214 | 1/1969 | Vadas | 146—6 |

W. GRAYDON ABERCROMBIE, Primary Examiner

U.S. Cl. X.R.

146—6, 241